(12) United States Patent
Lanza di Scalea et al.

(10) Patent No.: US 9,689,760 B2
(45) Date of Patent: Jun. 27, 2017

(54) STRESS DETECTION IN RAIL (71) Applicant: The Regents of the University of California, Oakland, CA (US)

(72) Inventors: Francesco Lanza di Scalea, San Diego, CA (US); Claudio Nucera, San Diego, CA (US); Robert Phillips, El Cajon, CA (US); Stefano Coccia, Los Angeles, CA (US)

(73) Assignee: The Regents Of The University Of California, Oakland, CA (US)

( * ) Notice: Subject to any disclaimer, the term of this patent is extended or adjusted under 35 U.S.C. 154(b) by 522 days.

(21) Appl. No.: 14/356,615

(22) PCT Filed: Oct. 30, 2012

(86) PCT No.: PCT/US2012/062529
§ 371 (c)(1),
(2) Date: May 7, 2014

(87) PCT Pub. No.: WO2013/070455
PCT Pub. Date: May 16, 2013

(65) Prior Publication Data
US 2014/0316719 A1    Oct. 23, 2014

Related U.S. Application Data

(60) Provisional application No. 61/558,353, filed on Nov. 10, 2011.

(51) Int. Cl.
*G01L 1/00* (2006.01)
*G01L 1/25* (2006.01)
*G01M 5/00* (2006.01)

(52) U.S. Cl.
CPC ........... *G01L 1/255* (2013.01); *G01M 5/0025* (2013.01); *G01M 5/0066* (2013.01)

(58) Field of Classification Search
CPC ..... G01N 2203/0062; G01N 2291/044; G01N 2291/2623; G01N 29/07; G01N 29/11; G01N 29/30
See application file for complete search history.

(56) References Cited

U.S. PATENT DOCUMENTS 2,949,028 A * 8/1960 Joy .................. G01N 29/07
                                                  310/317
5,386,727 A    2/1995 Searle
(Continued)

OTHER PUBLICATIONS

PCT International Search Report dated Mar. 15, 2013 for PCT application No. PCT/US2012/062529.
(Continued)

*Primary Examiner* — Elias Desta
(74) *Attorney, Agent, or Firm* — Mintz Levin Cohn Ferris Glovsky and Popeo, P.C.

(57) ABSTRACT

Methods and apparatus, including computer program products, are provided for determining rail stress. The method may include generating at least one ultrasonic guided wave to enable the at least one ultrasonic guided wave to propagate through a rail; detecting at least one of a fundamental frequency component of the at least one ultrasonic guided wave, one or more harmonics of the at least one ultrasonic guided wave, and/or a mixing component of the at least one ultrasonic guided wave; and determining a stress of the rail based on at least a nonlinearity parameter determined from the detected at least one of the fundamental frequency component, the one or more harmonics, and the mixing component. Related apparatus, systems, methods, and articles are also described.

27 Claims, 9 Drawing Sheets

(56) References Cited

U.S. PATENT DOCUMENTS

| | | | |
|---|---|---|---|
| 5,777,891 | A | 7/1998 | Pagano et al. |
| 6,055,862 | A | 5/2000 | Martens |
| 6,186,004 | B1 | 2/2001 | Kaduchak et al. |
| 6,324,912 | B1 | 12/2001 | Wooh |
| 6,401,044 | B1 | 6/2002 | Ibanez Rodriguez et al. |
| 6,570,497 | B2* | 5/2003 | Puckette, IV ............ B61K 9/08 340/301 |
| 6,715,354 | B2 | 4/2004 | Wooh |
| 7,082,833 | B2* | 8/2006 | Heyman ................ G01N 29/07 73/598 |
| 7,882,742 | B1 | 2/2011 | Martens |
| 7,942,058 | B2 | 5/2011 | Turner |
| 8,020,446 | B2 | 9/2011 | Bestebreurtje |
| 8,626,459 | B2 | 1/2014 | Di Scalea et al. |
| 9,010,186 | B2 | 4/2015 | Pagano |
| 2004/0003662 | A1 | 1/2004 | Kenderian et al. |
| 2005/0072236 | A1 | 4/2005 | Heyman et al. |
| 2006/0201253 | A1 | 9/2006 | Gonzales et al. |
| 2007/0214892 | A1* | 9/2007 | Turner ................. B61K 9/08 73/602 |
| 2008/0201089 | A1 | 8/2008 | Diaz et al. |
| 2009/0056454 | A1 | 3/2009 | Turner |
| 2010/0024559 | A1 | 2/2010 | Bossi et al. |
| 2011/0238336 | A1 | 9/2011 | Di Scalea et al. |
| 2016/0304104 | A1 | 10/2016 | Witte et al. |
| 2016/0305915 | A1 | 10/2016 | Witte et al. |

OTHER PUBLICATIONS

Bartoli, Ivan, et al. "Stress dependence of ultrasonic guided waves in rails." Transportation Research Record: Journal of the Transportation Research Board 2159 (2010): 91-97.

Chen, Feng, and Paul D. Wilcox. "The effect of load on guided wave propagation." Ultrasonics 47.1 (2007): 111-122.

Damljanovi?, Vesna, and Richard L. Weaver. "Forced response of a cylindrical waveguide with simulation of the wavenumber extraction problem." The Journal of the Acoustical Society of America 115.4 (2004): 1582-1591.

Egle, D. M., and D. E. Bray. "Measurement of acoustoelastic and third?order elastic constants for rail steel." The journal of the Acoustical Society of America 60.3 (1976): 741-744.

Kerr, Arnold D. "Lateral buckling of railroad tracks due to constrained thermal expansions-a critical survey." Proc. Symp. Railroad Track Mechanics (Princeton University, New Jersey, USA, 1975). Ed. A. D. Kerr. 1978.

Kerr, Arnold D. Thermal Buckling of Straight Tracks: Fundamentals, Analyses, and Preventive Measures. No. FRA/ORD-78/49 Intrm Rpt.. 1978.

Kish, A., and D. Clark. "Better management of CWR neutral temperature through more efficient distressing." Proceedings of 2004 AREMA Conference, May 2004.

Loveday, Philip W. "Semi-analytical finite element analysis of elastic waveguides subjected to axial loads." Ultrasonics 49.3 (2009): 298-300.

Read, D. "Evaluation of the MAPS-SFT rail neutral temperature measurement technique." Technology Digest TD-10-002, Transportation Technology Center, Inc (2010).

Read, David, and Andrew Kish. "Automation of Rail Neutral Temperature Readjustment Methodology for Improved CWR Performance." Railway Track and Structures 104.5 (2008).

Read, David, and Bill Shust. "Investigation of prototype rail neutral temperature measurement system." Railway Track and Structures 103.6 (2007).

Rose, Joseph L., et al. "Guided wave inspection potential of defects in rail." NDT & E International 37.2 (2004): 153-161.

Wilcox, P., et al. "Guided wave testing of rail." Insight-Non-Destructive Testing and Condition Monitoring 45.6 (2003): 413-420.

* cited by examiner

STRESS DETECTION IN RAIL

CROSS-REFERENCE TO RELATED APPLICATIONS

This application is a national stage application, filed under 35 U.S.C. §371, of PCT Application No. PCT/US2012/062529, filed on Oct. 30, 2012, which claims the benefit of priority of U.S. Provisional Patent application Ser. No. 61/558,353, filed on Nov. 10, 2011, and entitled "STRESS DETECTION IN RAIL". The contents of both applications are incorporated herein by reference in their entirety for all purposes.

STATEMENT OF GOVERNMENT SPONSORED SUPPORT

This invention was made with government support under grant No. FR-RRD-0009-10-01-00 awarded by Federal Railroad Administration (FRA). The government has certain rights in the invention.

BACKGROUND

Today, railways typically use continuous-welded rail (CWR). In CWR, the rails are welded to form a very long, so-called "continuous" rail. In some instances, the CWR may be one or more miles in length. CWR came into use because it requires fewer joints, providing thus a smoother ride for the train and passengers. With the advent of high-speed rail, CWR allows the train to travel over the rails with less friction as there are fewer joints causing friction. CWR can also be used in passenger and freight rail transportation systems that run at low or regular speeds.

SUMMARY

Methods and apparatus, including computer program products, are provided for detecting thermal stresses in rail, such as for example continuous-welded rail. In one aspect, there is provided a method. The method may include generating at least one ultrasonic guided wave to enable the at least one ultrasonic guided wave to propagate through a rail; detecting at least one of a fundamental frequency component of the at least one ultrasonic guided wave, one or more harmonics of the at least one ultrasonic guided wave, and/or a mixing component of the at least one ultrasonic guided wave; and determining a stress of the rail based on at least a nonlinearity parameter determined from the detected at least one of the fundamental frequency component, the one or more harmonics, and/or the mixing component.

In some implementations, one of more variations may be made as well as described in the detailed description below and/or as described in the following features. The at least one ultrasonic guided wave may comprise at least one wave propagating along a running direction of the rail. The detected at least one of the fundamental frequency component, the one or more harmonics, and the mixing component may be normalized. The nonlinearity parameter may be determined based on at least one of the fundamental frequency component, the one or more harmonics, and the mixing component. The nonlinearity parameter may be determined based on one or more of Equations 2 or Equation 3 below. The nonlinearity parameter may be determined based on one or more of Equations 4a and 4b below. A rail neutral temperature may be determined based on at least the nonlinearity parameter, wherein the rail neutral temperature represents a temperature of the rail at which a rail thermal stress is about zero. The stress may comprise thermal stress. The stress may comprise at least one of a tensile stress, a compressive stress, and a rail thermal stress at a rail neutral temperature. The thermal stress may be determined based on at least one of a historical neutral temperature of the rail and a wave velocity.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

BRIEF DESCRIPTION OF THE DRAWING

These and other aspects will now be described in detail with reference to the following drawings.

Like reference symbols in the various drawings indicate like elements.

DETAILED DESCRIPTION

With the advent of continuous-welded rail (CWR), the rail industry has become increasingly concerned with failures caused by restrained thermal expansion and contraction. Specifically, excessive tensile loads, occurring in cold weather, can lead to rail breakage, and during warm weather, excessive compression loads may lead to rail buckling. Breakage and/or buckling may lead to failures, which may lead to train derailments. To avoid such catastrophes, mechanisms to determine the longitudinal forces (or stresses) in the rail as a function of changing rail temperature may be used. By knowing the existence and/or location of excessive tensile loads and/or excessive compressive loads remedial actions can be taken, such as for example cutting sections of rail and/or inserting rail plugs to avoid rail breakage in cold weather or rail buckling in hot weather.

A property of a rail is the neutral temperature ($T_N$). The neutral temperature represents the rail temperature at which the thermal longitudinal force (or stress) in the rail is zero. The neutral temperature may be associated with the laying (or anchoring) temperature of a rail, but even at the rail's neutral temperature $T_N$, the rail may be in a state having residual stresses caused by at least the manufacturing of the rail. However, the neutral temperature mechanisms described herein are directed to determining the thermal stresses of the rail.

The current longitudinal force, P, in a rail may be mapped to the current rail temperature, T. For example, longitudinal force, P, in a rail may be given by the following equation:

$$P = A\sigma = -\alpha EA(T - T_N) \quad \text{Equation (1),}$$

wherein

P is a thermal load generated in the rail by the constrained thermal deformation, A is the cross-sectional area of the rail, σ is the longitudinal thermal stress in the rail (e.g., also referred to as thermal stress), α is the coefficient of thermal expansion of steel, E is Young's Modulus of steel, T is the current rail temperature; and $T_N$ is the neutral temperature. As such, when the current rail temperature is equal to the neutral temperature ($T=T_N$), the resulting thermal load, P, is about zero (and the corresponding thermal stress, σ, is also about zero).

The neutral temperature, $T_N$, of the rail while in service is relatively dynamic in the sense that the neutral temperature, $T_N$, may change due to numerous factors. For example, the rail's neutral temperature may change while in service due to rail kinematics (e.g., creep, breathing, ballast settlement, and the like) and rail maintenance (e.g., installation, realignment, distressing, broken rail repairs, and the like). Even for a rail with a known laying temperature or anchoring temperature, the neutral temperature for a rail in service may not be known. In some exemplary embodiments, the mechanisms described herein relate to determining in-situ the neutral temperature of a rail to enable a determination of the compressive and/or tensile stresses in the rail—enabling remedial action to prevent rail breakage in cold weather and rail buckling in hot weather.

In some exemplary embodiments, there is provided a system, a method, and/or computer-readable medium configured to determine the neutral temperature, $T_N$, of a rail, such as a continuous-welded rail (CWR), when the rail is in-service. In some exemplary embodiments, the determination of the neutral temperature, $T_N$, may be made by measuring the longitudinal, thermal stresses, σ, in the rail at a given, current rail temperature, T. In some exemplary embodiments, the measurement of the thermal stress, σ, may be achieved by measuring the nonlinear behavior of ultrasonic guided waves that propagate along the rail in the longitudinal direction (e.g., which runs parallel to the running direction of the train). Moreover, specific ultrasonic guided wave modes and specific guided ultrasonic wave frequencies may be used, in some exemplary embodiments, for the measurement of the thermal stress, σ. The ultrasonic guided waves may comprise any waves that propagate along the rail's running directions and are therefore guided by the rail's cross-sectional geometry. The rail acts like as a waveguide propagating the ultrasonic waves. A guided wave mode refers to a type of guided wave that can propagate in the rail (e.g., a flexural mode, an axial mode, a torsional mode, and other types as well).

The nonlinear behavior of ultrasonic guided waves may develop along the longitudinal (e.g., running) direction of the rail, and these ultrasonic guided waves may be measured. For example, the nonlinearities of the ultrasonic guided waves may be measured by higher-harmonic generation and/or frequency mixing, both of which are described further below. These measurements of the nonlinearities may be mapped to state of thermal stresses, σ, in the rail and/or the neutral temperature, $T_N$, of a rail in accordance with Equation 1. Furthermore, a determination of whether a rail is in compressive or tensile stress may be based on at least a nonlinearity measurement and a measurement of the current rail temperature, T.

In some exemplary embodiments, the nonlinearities of the guided ultrasonic waves may be measured by higher-harmonic generation. Higher-harmonic generation refers to generating an ultrasonic guided ultrasonic wave at a given fundamental frequency, propagating that guided ultrasonic wave in the rail, measuring the higher-order harmonics of the ultrasonic guided ultrasonic wave and, in some cases, normalizing the higher-order harmonics to the fundamental frequency component.

Figure 1:
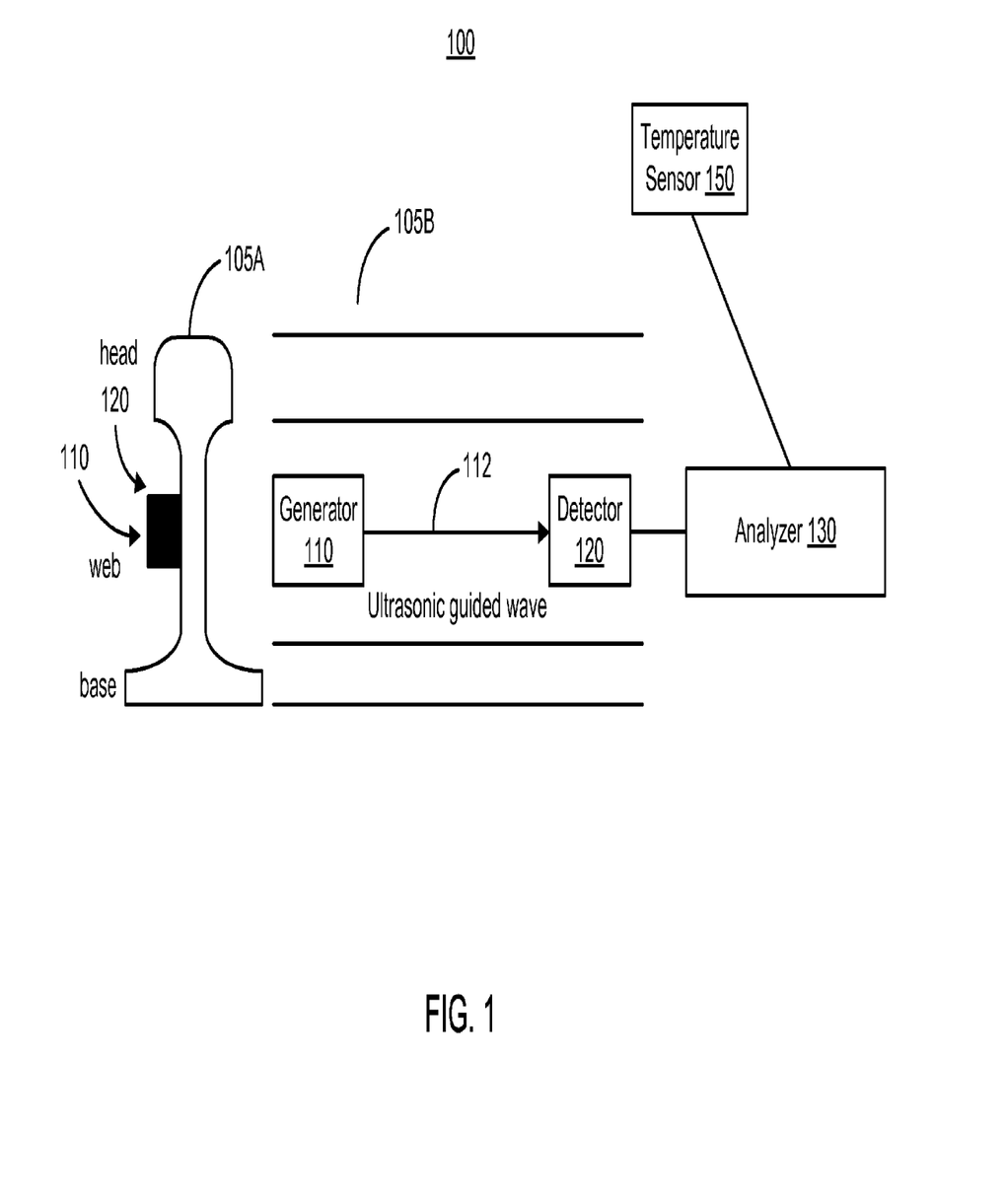
FIG. 1 depicts an example system for detecting thermal stress in rail.

FIG. 1 depicts an example of a system 100 including a generator 110 for generating waves, a detector 120 for measuring properties associated with the generated waves, a temperature sensor 150 for measuring the temperature of the rail 105B, and an analyzer 130 for analyzing the stresses in the 105B. FIG. 1 also depicts an end view rail 105A, and a side view is depicted at 105B. The generator 110 and detector 120 may be proximate to rail 105B or affixed to rail 105B by a variety of mechanisms including gel-like ultrasonic couplant, dry coupling, adhesive, magnetism, and the like. In the example of FIG. 1, the generator 110 and detector 120 are positioned along the rail web (e.g., along the neutral axis of the rail), although other positions may be used as well (e.g., along the rail head, such as on the field side or on the top of the head in the case of magnetic mounting for quick removal prior to the passing of a train).

Figure 2:
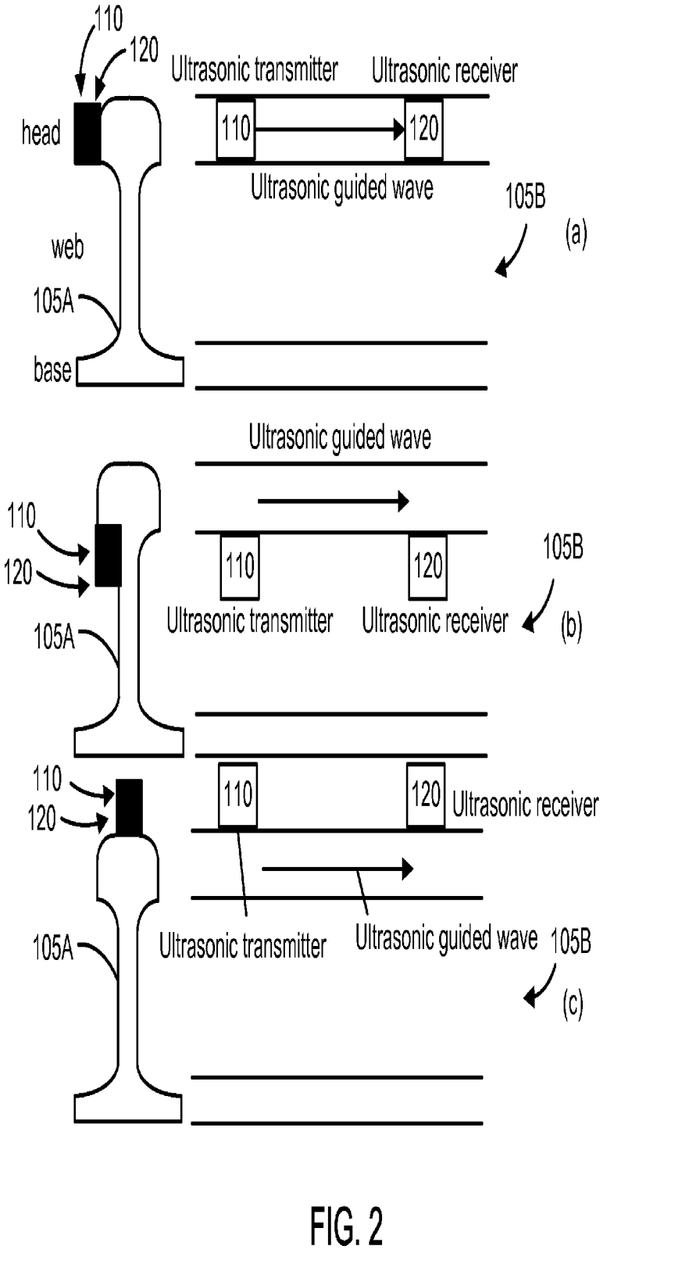
FIG. 2 depicts examples of placement for detectors and generators for detecting thermal stress in rail.

FIG. 2 depicts additional examples of various positions for placement of the generator 110 and detector 120, although other detector and generator placements may be used as well. Moreover, although FIGS. 1 and 2 depict a single generator 110 and detector 120, a plurality of generators and detectors may be used as well.

In implementations configured to determine tensile and compressive stresses using higher-harmonic generation, generator 110 generates an ultrasonic guided wave (e.g., a signal). The generator 110 may generate an ultrasonic guided wave in the rail 105B at a fixed frequency, $f_1$ (which is referred to herein as a fundamental frequency). The generated ultrasonic guided wave in rail 105B propagates 112 through the rail 105B causing an ultrasonic nonlinearity which may manifest itself as higher-order harmonics of the fundamental frequency, $f_1$. For example, the ultrasonic nonlinearity may manifest itself as twice the frequency, $f_1$ (e.g., a second harmonic), three times the frequency $f_1$ (e.g., a third harmonic), and so forth (e.g., n times the frequency $f_1$, the $n^{th}$ harmonic).

The detector 120 may then be used to measure one or more aspects of the ultrasonic nonlinearity. For example, the detector 120 may measure a parameter, β, representative of the energy (e.g., amplitude) of one or more of the harmonics of the fundamental frequency of the ultrasonic guided wave generated by generator 110 and a fundamental frequency component of the ultrasonic guided wave. This parameter, β, is referred to herein as the ultrasonic nonlinear parameter, β. The ultrasonic nonlinear parameter, β, may be determined based on, in some exemplary embodiments, the amplitude of one or more harmonics, $A_n$ (n×$f_1$) of the ultrasonic nonlinearities detected by detector 120. Moreover, these amplitudes may be normalized by, for example, the amplitude of the fundamental frequency component of ultrasonic guided wave. In some exemplary embodiments, the ultrasonic nonlinear parameter, β, may be determined in accordance with the following equation:

$$\beta = A_n(n \times f_1)/A_1(f_1)^n \text{ for } n=2,3,\ldots N \quad \text{Equation (2),}$$

wherein

β is an ultrasonic nonlinear parameter, $A_n$ is the amplitude of the nth harmonic frequency, $n \times f_1$, $A_1$ is the amplitude of the fundamental frequency, $f_1$.

$\hat{n}$ represents the amplitude of the fundamental frequency, $A_1(f_1)$, to the $n^{th}$ power, and n may vary from the second harmonic, 2, to the $n^{th}$ harmonic, N.

In some exemplary embodiments, the ultrasonic nonlinear parameter, β, may be determined by normalizing the amplitudes by for example the amplitude of the fundamental frequency of the ultrasonic guided wave in accordance with the following equation:

$$\beta = A_n(n \times f_1)/A_1(f_1) \text{ for } n=2,3,\ldots N \quad \text{Equation (3)}.$$

The amplitudes in Equations 2 and 3 may be determined based on a transform, such as for example the Fourier Transform (or the Fast Fourier Transform). For example, detector 120 and/or analyzer 130 may receive the propagated waves including one or more higher order harmonics of the fundamental frequency of the ultrasonic guided wave and then perform a transform, such as for example a Fourier Transform, a Fast Fourier Transform, and the like, to extract the magnitude values of one or more higher order harmonics and the fundamental frequency. These magnitude values of the higher order harmonics and the fundamental frequency may be used in Equations 2 and 3 as the amplitude values $A_n$ to enable a determination of the ultrasonic nonlinear parameter, β.

In some exemplary embodiments, the neutral temperature, $T_N$, of a rail may be determined based on an ultrasonic nonlinear parameter, β, using only the second harmonic (e.g., n=2), although a plurality of harmonics may be used as well.

In some exemplary embodiments, the ultrasonic nonlinear parameter, β, may be used for wayside testing of rail, although it may be used for in-motion rail testing as well.

In some exemplary embodiments, the nonlinearities of the guided ultrasonic waves may be measured by frequency mixing. Frequency mixing refers to generating an ultrasonic guided wave at a given first frequency, $f_1$, and a given second frequency, $f_2$, propagating the first and second frequencies, and then measuring the sum and/or difference of the first and second frequencies.

In implementations configured to determine tensile and compressive stresses using frequency mixing, generator 110 generates ultrasonic guided waves in rail 105B at fixed frequencies, $f_1$ and $f_2$. The generated ultrasonic waves (including the two separate fundamental frequencies, $f_1$ and $f_2$) are simultaneously applied to rail 105B and then propagate 112 through the rail 105B causing an ultrasonic nonlinearity. The ultrasonic nonlinearity may also include components caused by frequency mixing between frequencies $f_1$ and $f_2$. These frequency mixing components may include the sum frequency (e.g., the sum of frequency $f_1$ and frequency $f_2$) and the difference frequency (e.g., the difference between frequency $f_1$ and frequency $f_2$). To capture these frequency components, detector 120 and/or analyzer 130 may determine the ultrasonic nonlinear parameter, β, based on at least the amplitude of the frequency mixed components, $A_m(f_1+f_2)$ or $A_m(f_1-f_2)$. In some exemplary embodiments, the amplitude of the frequency mixed components may be normalized by, for example, the higher of the two fundamental frequencies, $f_2$ in accordance with the following equations:

$$\beta = A_m(f_1+f_2)/A_2(f_2) \quad \text{Equation (4a)}$$

$$\beta = A_m(f_1-f_2)/A_2(f_2), \quad \text{Equation (4b)}$$

wherein

β is an ultrasonic nonlinear parameter, $A_m$ is the amplitude of the mixed component, and $A_2$ is the amplitude of the fundamental frequency, $f_2$.

The amplitudes in Equations 4a and 4b may be determined based on a transform, such as for example the Fourier Transform/Fast Fourier Transform. For example, detector 120 and/or analyzer 130 may receive the propagated waves including the mixed component frequencies (e.g., $f_1+f_2$ and/or $f_1-f_2$). In some exemplary embodiments, the ultrasonic nonlinear parameter, β, may be used for wayside determination of the neutral temperature, $T_N$, and in-motion determination of the neutral temperature, $T_N$.

In some exemplary embodiments, the nonlinear behavior of guided ultrasonic waves propagated along the longitudinal (e.g., running) direction of the rail may be measured using a wayside system. The following provides an example of an implementation of a wayside system.

In a first wayside configuration, the system 100 may include one or more detectors, such as for example detector 120, configured to monitor ultrasonic nonlinearity over time with varying rail temperature and under environmental temperature fluctuations. For example, the detector 120 may receive over time the amplitudes of one or more ultrasonic waves and process those waves with a Fast Fourier Transform and Equations 2, 3, 4a, and/or 4b and then determine the neutral temperature, $T_N$, based on Equation 1 at varying current temperatures. In this example, the rail neutral temperature, $T_N$, may correspond to the rail temperature at which the measured ultrasonic nonlinearity is at an extrema, such as for example a minimum value.

Figure 3:
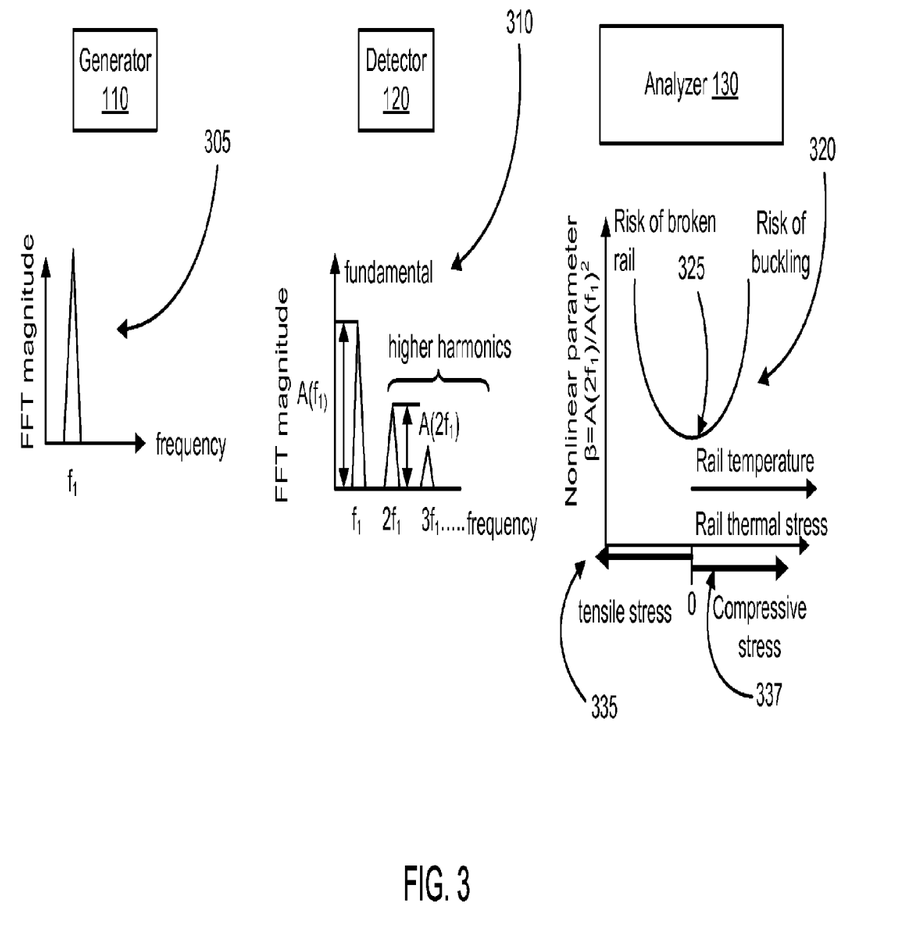
FIG. 3 depicts various plots related to detecting thermal stress in rail.

In another wayside configuration, the system 100 may include one or more detectors (e.g., ultrasonic transducers) configured to monitor the ultrasonic nonlinearities at a given, current rail temperature, T; while the instantaneous longitudinal stress, σ, in the rail may be determined based on the nonlinearity parameter, β, and historical information regarding the rail neutral temperature, $T_N$, of the rail (e.g., and/or previously recorded calibration plots of the rail, such as plot 320 depicted at FIG. 3). In this configuration, system 100 is configured to determine the neutral temperature, $T_N$, instantaneously once the current rail temperature, T, and nonlinearity parameter, β, are determined.

By measuring the nonlinearity of ultrasonic guided waves propagating at specific guided ultrasonic wave modes and guided ultrasonic wave frequencies along the longitudinal axis of the rail, the systems, methods, and computer-readable media described herein may enable a determination of the neutral temperature, $T_N$, of the rail at any given instant. For example, the ultrasonic nonlinearity as measured by the ultrasonic nonlinear parameter, β, may be a function of the level of thermal stress, σ, in the rail, and the level of thermal stress, σ, and rail's temperature T may be used to determine the rail's neutral temperature, $T_N$, based on for example Equation 1 above.

In some exemplary embodiments, system 100 may be configured wayside to a rail. In wayside configurations, one or more detectors, such as for example detector 120, may be implemented as for example ultrasonic transducers. These transducers may be proximate to, or attached to, rail 105B, as depicted at FIG. 1 and FIG. 2.

Referring again to FIG. 1, the generator 110 may generate an ultrasonic guided wave having a specific wave mode and a specific fundamental frequency $f_1$. The generated wave (or signal) represents energy that is applied to a portion of rail 105B.

FIG. 3 depicts generator 110 and a frequency domain plot 305 of the transmitted ultrasonic guided wave.

Referring again to FIG. 1, the generated ultrasonic guided wave may, in some implementations, comprise a signal having a high-voltage (e.g., an alternating current voltage of 1200 volts peak-to-peak) which may enhance the detection of the ultrasonic nonlinearity due to the thermal stress. The generated ultrasonic guided ultrasonic wave may propagate 112 through rail 105B, and then detector 120 receives signals including harmonics of ultrasonic guided wave and any mixed components (if present). Next, the detector 120 and/or analyzer 130 perform a transform on the received signals. For example, the detector 120 and/or analyzer 130 may perform a Fourier Transform in the frequency domain, and then extracts one or more amplitudes of the fundamental frequency $f_1$, the higher-harmonics, and/or the mixed components (which can be used in connection with Equations 2, 3, 4a, and 4b). FIG. 3 depicts an example plot 310 of the Fast Fourier Transform (FFT) of the received signals. The plot 310 includes the fundamental frequency $f_1$ and the higher-harmonics (e.g., twice and three times the fundamental frequency).

Referring again to FIG. 1, the analyzer 130 may then determine the nonlinear parameter, $\beta$, based on, for example, Equations 2, 3, 4a, and/or 4b. At about the same time, the temperature sensor 150 (e.g., a thermocouple, a remote infrared temperature sensor, and the like) may measure the current rail temperature, T.

In some exemplary embodiments, the determination of the ultrasonic nonlinear parameter, $\beta$, and rail temperature, T, are performed at different times of the day to allow the rail to go through a state of zero stress and thus neutral temperature. When this is the case, historical data may be formed for a rail that may be represented as a plot 320. Referring to FIG. 3, the plot 320 of the ultrasonic nonlinear parameter, $\beta$, and rail temperature, T, is generated and then recorded by the analyzer 130. In the example of FIG. 3, an extrema (e.g., minima 325) of the plot 320 corresponds to the zero-stress point and thus the neutral temperature, $T_n$. The analyzer 130 may use information, such as for example plot 320, and other historical information (e.g., ultrasonic nonlinear parameter, $\beta$, current rail temperature, T, and the like) to determine whether the rail 105B is in tensile stress (as depicted at 335) or compression stress (as depicted at 337). For example, for a determined nonlinear parameter, $\beta$, and a measured rail temperature, T, the analyzer 130 may determine whether rail 105B is in tensile stress (as depicted at 335) or compression stress (as depicted at 337).

In some exemplary embodiments, the system 100 may estimate the neutral temperature, $T_N$, instantaneously based on a single ultrasonic nonlinear parameter, $\beta$, determination at a single rail temperature T. For example, system 100 may predetermine, for a given type of rail and/or for a given rail manufacturer information, one or more plots (see, e.g., plot 320) of the ultrasonic nonlinear parameter, $\beta$, versus rail temperature, T. The plots of the ultrasonic nonlinear parameter, $\beta$, (see, e.g., plot 320) are generally symmetric around the minimum (point 325 in FIG. 3), which corresponds to the about zero thermal stress or rail neutral temperature point. In the case when only a single value of the ultrasonic nonlinear parameter, $\beta$, is determined, the plot 320 may still be used to determine the absolute value and sign of the thermal stress, $\sigma$, (e.g., whether tensile stress or compressive stress) based on historical information (e.g., the last known value of rail neutral temperature and the like). This absolute determination of stress, $\sigma$, may be made from a single measurement of the ultrasonic nonlinear parameter, $\beta$, for typical shifts of the rail neutral temperature over time while in service. This is because the usual causes of shifts in rail neutral temperature while in service (e.g., rail kinematics and/or rail maintenance) generally produce shifts smaller than +/−40 degrees Fahrenheit. With this assumption, and particularly so for large values of measured nonlinear parameter, $\beta$, a single nonlinear parameter, $\beta$, measurement may be used to determine whether the measured value of nonlinear parameter, $\beta$, is in tensile stress, $\sigma$, 335 or compressive stress, $\sigma$, 337.

System 100 may also determine a wave velocity parameter that can serve as additional information for determining the sign of the thermal stress, $\sigma$, being detected by the ultrasonic nonlinearity parameter, $\beta$. For example, the wave velocity parameter may be determined by measuring the wave arrival times from known positions of an ultrasonic generator and an ultrasonic detector. The wave of interest for velocity measurement will be a guided wave propagating in the running direction of the rail, i.e. in the thermal stress direction. Once the wave arrival time is known, this can be compared to previously determined values of stress-free wave velocity in a similar type of rail, which may serve as historical information representative of a velocity reference value. This velocity reference value may be previously measured in a similar type of rail at about zero thermal stress and/or calculated from known rail material of given elastic properties using wave velocity equations. If the current wave velocity is, for example, higher than the velocity reference value, that indicates the presence of tensile (e.g., positive) thermal stresses, $\sigma$. If, instead, the current wave velocity is smaller than the velocity reference value, that will indicate the presence of compressive (e.g., negative) thermal stresses, $\sigma$.

The wave velocity, which changes with stress, may indicate the sign of the stress, $\sigma$, to enable a determination of which side of the plot 320 (e.g., on the tensile stress side 335 or the compressive stress side 337) the ultrasonic nonlinear parameter, $\beta$, is on, and thus whether the ultrasonic nonlinear parameter, $\beta$, represents compression stress or tensile stress. The analyzer 130 may then determine whether the measured portion of rail 105 is in compression stress or tensile stress. Knowledge of the current thermal stress, $\sigma$, and temperature, T, may thus allow a determination of the rail Neutral Temperature, $T_N$, from Equation 1.

Figure 4:
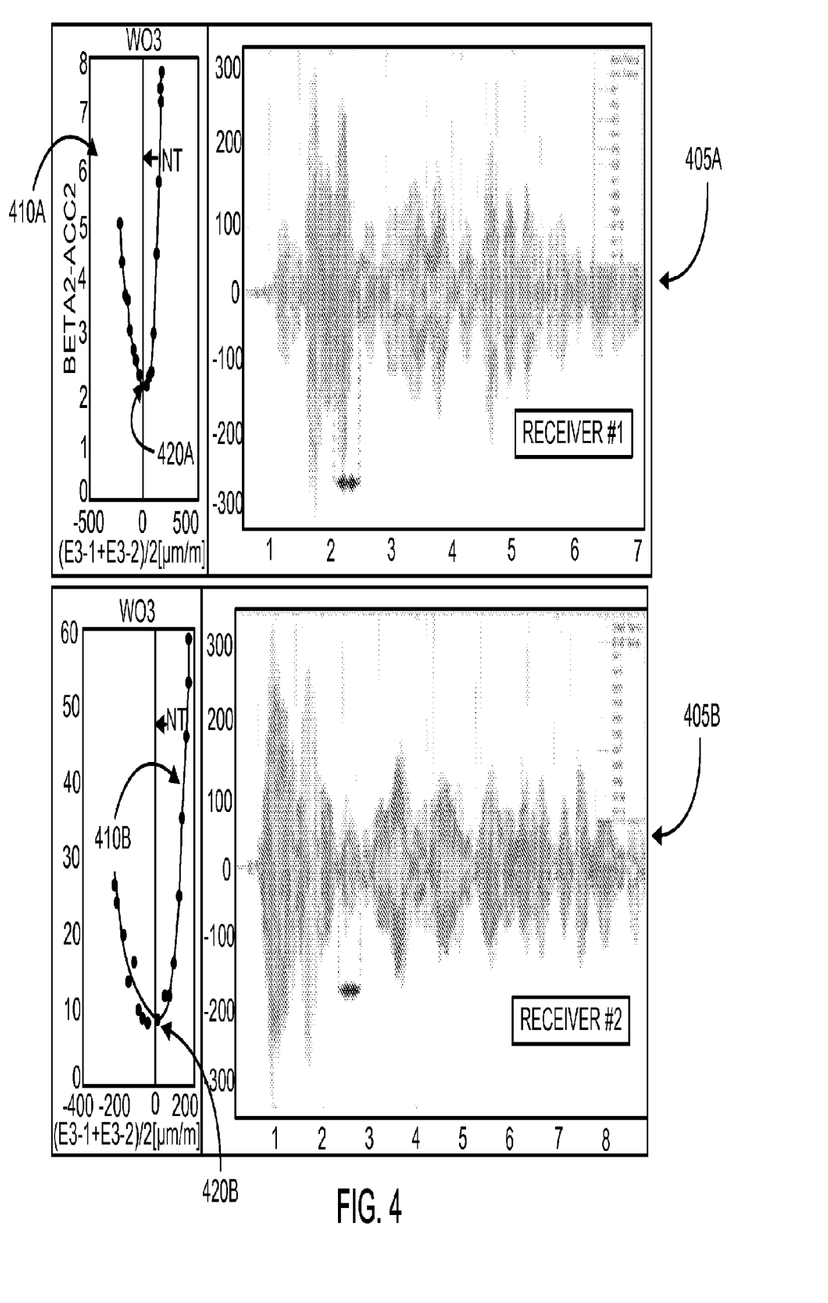
FIG. 4 depicts various plots related to detecting thermal stress in rail.

To illustrate an implementation, raw measurements 405A-B from two ultrasonic piezoelectric detectors and the corresponding nonlinear parameters, $\beta$, 410A-B are plotted at FIG. 4. The plots 410A-B were obtained using a system similar to system 100 but using two detectors (not just a single detector 120 as depicted at FIG. 1). The ultrasonic nonlinear parameter, $\beta$, is plotted at 410A-B against longitudinal thermal strains measured in the rail by strain gages as a result of a controlled increase in rail temperature, T. The plots 410A-B show u-shapes for the $\beta$ curves with minimums 420A-B at about the corresponding zero-strain point as measured by the strain gages (or, equivalently, the zero-thermal-stress point corresponding to the rail neutral temperature, $T_N$).

FIG. 4 also shows that both detectors detected several guided ultrasonic wave modes (see, e.g., the different packets in the time-domain traces). A specific wave mode may be selected by gating the detected signals at detector 120 in time, and then extracting the ultrasonic nonlinear parameter, $\beta$, values according to one of the equations above. In some implementations, a specific mode and a specific frequency is generated by generator 110 and then detected by detector 120, so only a specific mode and frequency are extracted to form the u-shape plot of the β curve, such as for example plot 320 as depicted at FIG. 3.

Although the description herein refers to plotting the nonlinearity parameters, β, as depicted at plot 320 (FIG. 3), the mechanisms described herein may use some of the information represented by, for example, the β curve of plot 320, without generating an actual plot. For example, numerical techniques may be used to determine an extrema corresponding to the neutral temperature, $T_N$, and thus tensile stress or the compressive stress, without generating plot 320.

Figure 5A:
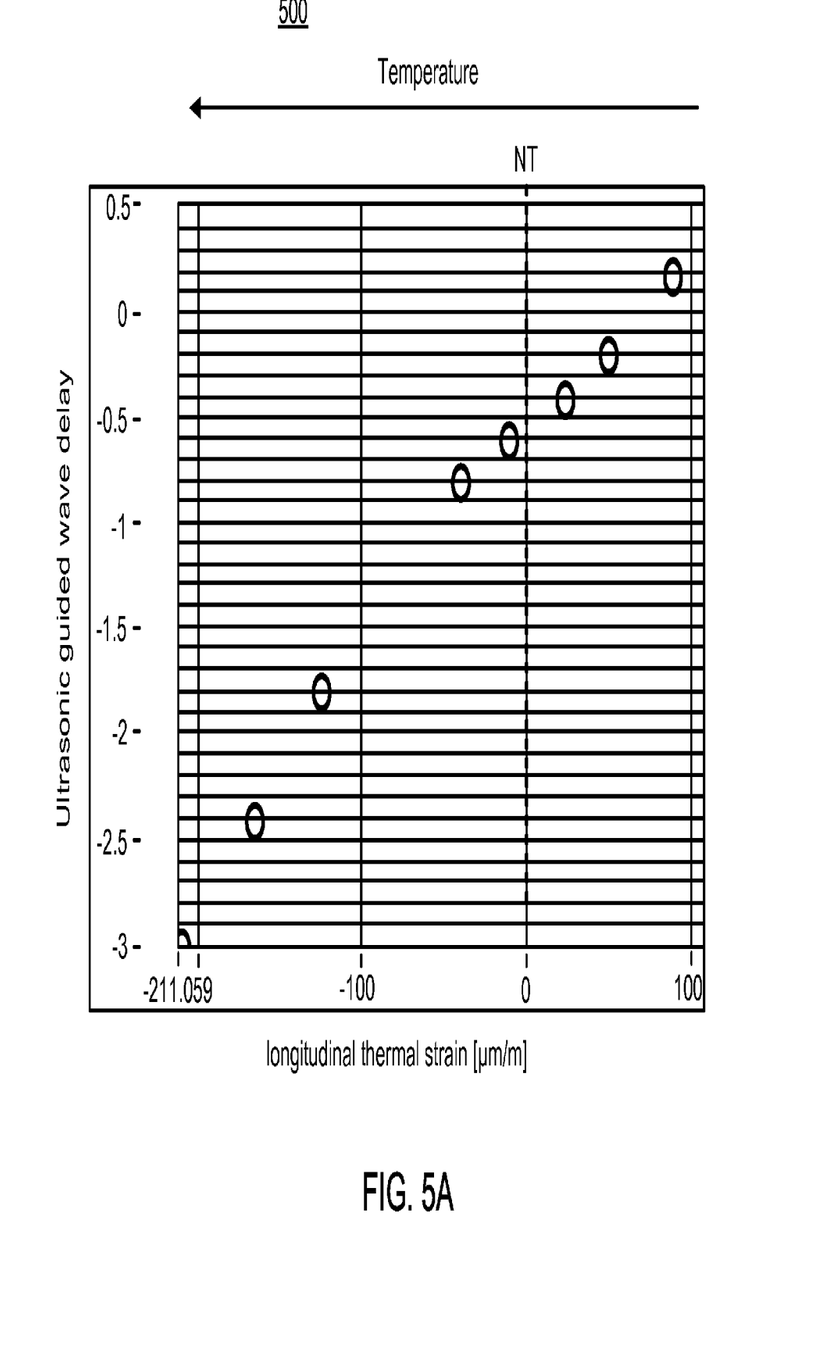
FIGS. 5A and 5B depict various plots related to detecting thermal stress in rail.
Figure 5B:
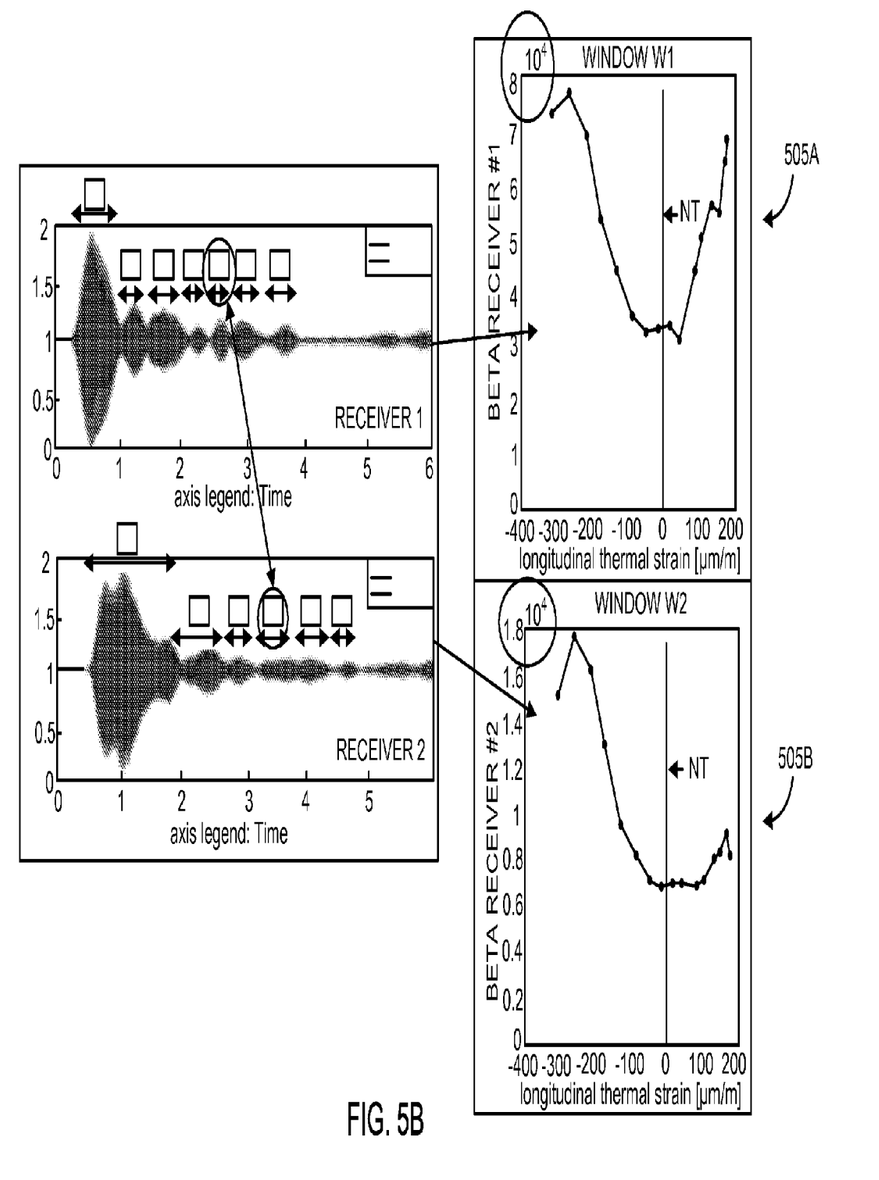

FIG. 5A depicts an example plot 500 of measurements of wave delay (related to wave velocity) as a function of thermal strains. The plot 500 was obtained with detectors (e.g., transducers) at the top of the railhead as depicted at FIG. 2(*c*). The wave delay may be measured by tracking the wave arrival time at the two detectors. This delay is directly related to wave velocity since the wave travelling distance remains constant during the temperature excursion. FIG. 5A shows a linear dependence between wave delay (or velocity) and thermal strains. The thermal strain is simply proportional to the thermal stress through the material Young's modulus. Once curve 500 is calibrated for different rail types and the effect of temperature variations alone are compensated, the plot 500 may provide information to at least indicate the sign of the thermal stress being measured by the ultrasonic nonlinear parameter, β, in absolute terms. FIG. 5B depicts plots 505A-B similar to plots 410A-B at FIG. 4. However, plots 505A-B were obtained using transducers at the top of the railhead as depicted at FIG. 2(*c*).

Although the above-described system 100 at FIG. 1 depicted a wayside configuration, system 100 may be configured for in-motion operation. For example, system 100 may be configured to travel over rail 105B to determine whether rail 105B is in tensile stress and/or compressive stress.

Figure 6:
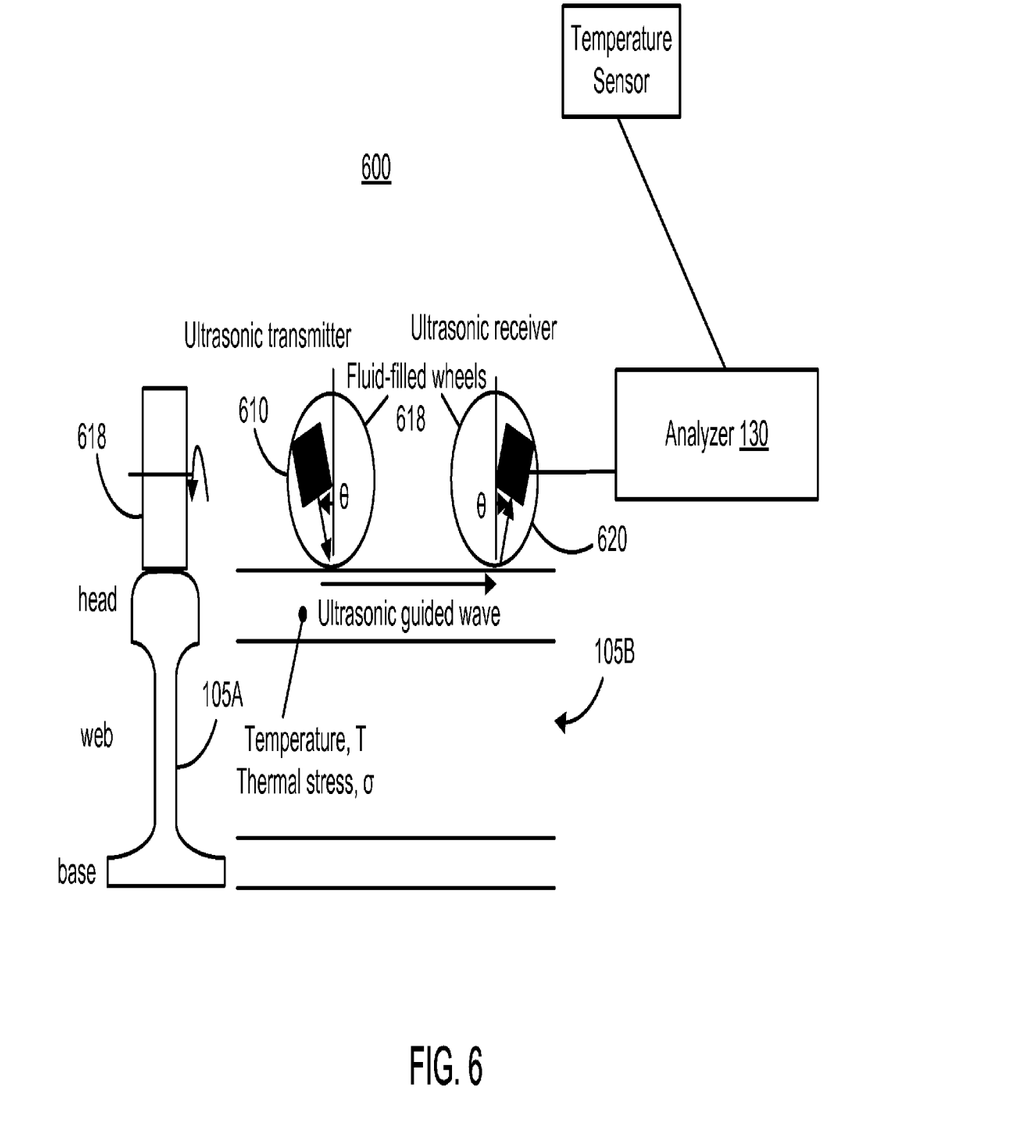
FIG. 6 depicts another example system for detecting thermal stress in rail.

FIG. 6 depicts a system 600 configured as an in-motion implementation. System 600 is similar to system 100 in some respects but may include a generator 610 and a detector 620 (e.g., ultrasonic transducers) configured for motion relative to the rail 105B. For example, the generator 610 and/or the detector 620 may be implemented as a non-contact device (e.g., an electro-magnetic acoustic transducer (EMAT), laser-based, air coupled transducers, or the like) or a contact device (e.g., a wheel-based transducer as shown in FIG. 6, a sled-based transducer, or the like). Although FIG. 6 depicts the generator 610 and the detector 620 implemented as wheel-based devices, other types of devices may be used as well. Moreover, while FIG. 6 depicts the position of the in-motion system at the top of the railhead, other positions may be implemented as well, for example under the railhead or along the rail web.

The generator 610 and the detector 620 may be oriented in the wheels 610 at a given angle that, through Snell's law of refraction, generates a specific guided ultrasonic wave mode in the rail 105B. As in the wayside implementation, either higher-harmonic generation or frequency mixing approaches may be used to extract the ultrasonic nonlinear parameter, β, related to the thermal stress, as described above.

Referring again to FIGS. 1 and 6, the generator, such as for example the generators 110 and 610, may be implemented as a device for applying energy to the rail under test. The energy applied may be in the form of radiation energy (e.g., laser energy where a laser acoustic generator is used), acoustic wave energy (e.g., where a piezoelectric ultrasonic transducer that emits ultrasonic waves is used), electromagnetic energy (e.g. an electromagnetic-acoustic transducer or EMAT), or mechanical energy (e.g. an impactor). In some implementations where the dimensions of the object (e.g., a rail) are such that multiple measurements are required (e.g., for a long rail of a railroad track that may be extending over hundreds or thousands of miles), the generator may be mounted or fitted on some moving structure (for example, a moving platform towed by a locomotive). Under those circumstances, the generator 610 applies energy to the object, such as for example rail 105B, along a moving application point. The moving application point may be moving at a speed matching, for example, the speed of the locomotive or slower.

The generator, such as for example generators 110 and/or 610, may apply energy that, when applied to the object, such as for example rail 105B, at an application point, causes, or excites, resulting waves to pass, or travel, at least partly, through the rail 105B. In some implementations, the generator is an ultrasonic generator to cause ultrasonic waves to travel through the rail 105B. The generator may be a contact generator, in which the generator is mechanically coupled to the rail 105B (e.g., via a coupling layer such as a suitable fluid couplant, e.g. water), and causes resultant waves (acoustic waves) through mechanical excitation. Suitable contact-based generators may include, for example, an ultrasonic wheel generator (i.e., a moveable generator displaced over the object), an ultrasonic sled generator, and/or a water-coupled generator. These types of generators may include an ultrasonic transducer implemented, for example, using a piezoelectric element, or some other vibrating transducer, that mechanically oscillates at frequencies controllable by regulating the voltage/current applied to the piezoelectric element. In such implementations, the energy applied to the rail is in the form of acoustic (ultrasonic) waves.

In some implementations, the generator, such as for example generators 110 and/or 610, may be a non-contact generator, i.e., the generator is not in direct mechanical contact with the object, such as for example rail 105, to be inspected. A suitable non-contact generator may be an air-coupled transducer that includes a mechanical vibrating transducer (e.g., such as a piezoelectric element or a capacitive element) that can controllably oscillate to produce the ultrasonic waves applied to the rail. The output port of such a generator is placed proximate to the rail, and emitted ultrasonic waves are directed to the rail at the application point via an air layer separating the output port of the generator and the object. Another suitable non-contact ultrasonic generator may include a generator with an electro-magnetic-acoustic transducer (EMAT). In an EM acoustic transducer, a current may be induced to flow in the surface by using a coil positioned proximate to the surface of the object, and a solenoid/permanent magnet causes a magnetic field to be generated perpendicular to the current flow, to thus cause a force to be exerted on the rail. The stress fields resulting from the exerted force cause ultrasonic waves to be generated. Yet another suitable non-contact generator is a pulsed laser ultrasonic generator that applies laser radiation to the rail at the application point to cause waves to be generated in the rail in either the thermoelastic regime or the ablative regime. In another non-contact inspection technique, referred to as Eddy Current testing, a coil generates a changing magnetic field that generates eddy currents. Variations in the phase and magnitude of these eddy currents can be monitored using the same or a different coil, and/or by measuring changes to the current flowing in the first (excitation) coil.

Other types and/or implementations of generators to cause waves to travel in the rail to be inspected may also be used.

The generator, such as for example generators 110 and/or 610, may thus excite waves (e.g., ultrasonic waves) in the rail. The excited waves (e.g., ultrasonic) travel in the rail 105B. The traveling waves include, for example, guided waves that may induce nonlinearity, which is used to derive a nonlinearity parameter β, as described above.

At least a portion of the waves traveling in rail 105B is detected by a detector, such as for example detectors 120 and 620 depicted at FIGS. 1 and 6. In some exemplary embodiments, the detector may be included in the generator. For example, a contact-based generator implemented using a piezoelectric transducer may use the same transducer to detect returning traveling waves. Returning ultrasonic sound waves cause vibration of the piezoelectric transducer, which in turn cause the transducer to generate a voltage that is a function of the properties (e.g., amplitude, frequency) of the detected portion of the waves. In some implementations, the contact-based generator may include a separate transducer to cause ultrasonic waves in the rail, and another transducer to detect at least a portion of the waves. In some exemplary embodiments, a non-contact generator may also include a detector to detect at least a portion of the waves traveling in the rail. For example, in a laser acoustic generator, a reflected beam of a laser device (same as the one that caused the ultrasonic waves, or a different laser device) may be examined by an interferometer. Small shifts in the frequency of the reflected laser beam or shifts in the length of the optical beam path caused by ultrasonic waves causing vibrations at the surface of the rail can be identified by the interferometer. In some embodiments, the detector may include a microphone to detect ultrasonic waves or a transducer. In some embodiments, the generator/detector can be an electromagnetic-acoustic transducer (EMAT) device.

In some implementations, the detector, such as for example detectors 120 and/or 620, may be configured to detect particular types of waves by controlling, for example, a time window during which the detector detects traveling waves. For example, certain waves may reach the surface near which the detector is located during some estimated time period, while other types of waves may reach the detector at other estimated time periods. Thus, by detecting traveling waves at pre-determined time periods, the detector may be configured to detect particular waves that traveled over some estimated path.

Moreover, the detector may, in some exemplary embodiments, include a processor to determine a transform, such as for example a Fourier Transform/Fast Fourier Transform, of the signals from the generator. The output of the detector may then be provided to an analyzer, such as for example analyzer 130 depicted at FIGS. 1 and 6.

In some embodiments, the generator, such as for example generators 110 and/or 610, may cause waves having at least two different frequencies to travel through the rail 105B, as noted above, and the detector, such as for example detectors 120 and/or 620, may detect those different frequencies as well as harmonics and/or mixing components of those frequencies.

The detector, such as for example detectors 120 and/or 620, may produce output responsive to the detected portion of the waves. For example, the detector may produce data that is representative of the behavior (e.g., the amplitude as a function of time and/or magnitude and phase as a function of frequency) of the detected portion of the waves. The output produced is provided to an analyzer, such as for example analyzer 130, which is configured to perform an analysis based on a current output produced by the detector.

The analysis performed by the analyzer 130 may then be used to determine whether the rail is under tensile stress or compress stress. In some embodiments, the analyzer may be part of the generator and/or the detector (i.e., it may constitute a module of an integrated system that may include the generator, detector and/or the analyzer), or the analyzer may be a physically separate unit from the generator and/or the at least one detector.

Figure 7:
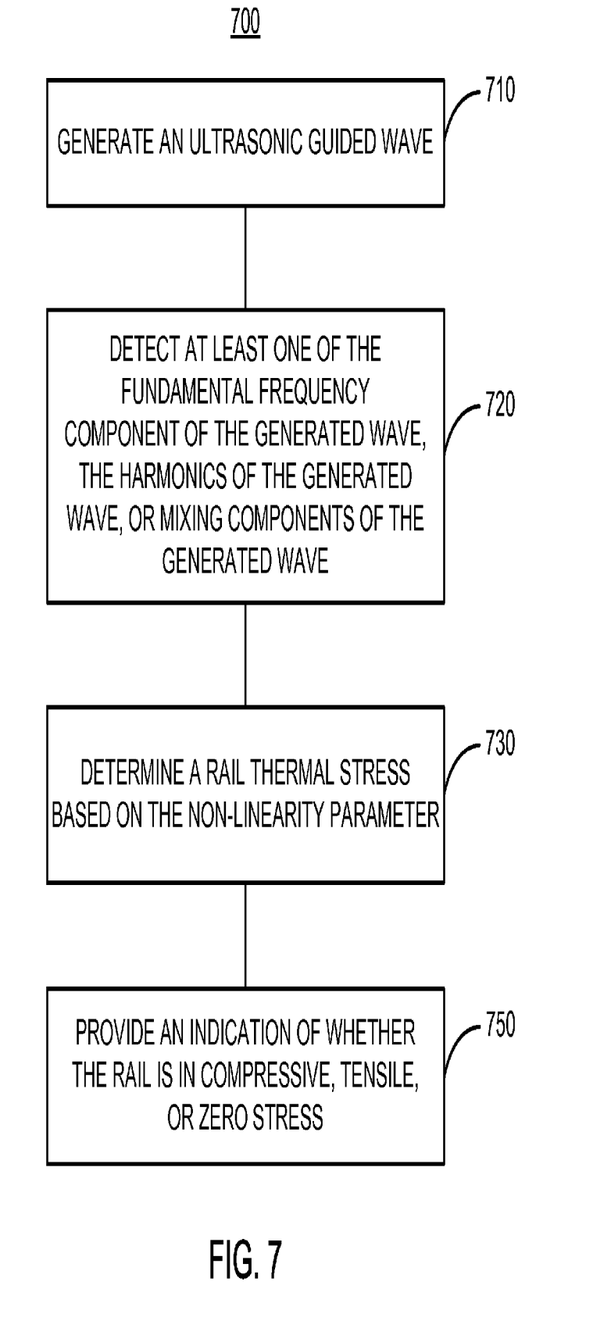
FIG. 7 depicts an example of a process for detecting thermal stress in rail.

FIG. 7 depicts a flowchart of a process 700 for detecting whether a rail is in tensile or compressive stress. The description of process 700 may also refer to FIG. 1.

At 710, an ultrasonic guided wave is generated and then applied to an object, such as for example rail 105B, at an application point to cause resultant waves (e.g., ultrasonic waves) to travel, at least partly, through rail 105B. The energy may be applied by one or more generators, such as for example generators 110 and/or 610, which may include contact type generators (e.g., piezoelectric transducers, ultrasonic wheels, ultrasonic sleds, water coupled generators, etc.), or non-contact generators (such as for example a laser acoustic system, air-coupled transducers, electromagnetic-acoustic transducer (EMAT), eddy current transducer, etc.)

Having caused waves to travel in the object (an object such as for example a rail), at least a portion of the waves traveling through the rail 105B is detected 720 by one or more detectors. The detectors, such as for example detectors 120 and/or 620, are configured to detect, for example, acoustic waves, including ultrasonic waves, and can be controllably configured to detect particular types of waves, e.g., guided ultrasonic waves, etc., by, for example, controlling the time window during which the detectors detect waves, as well as the wave generation angles. For example, the detector detects at least the fundamental frequency component(s) of the guided wave, the one or more harmonics of the guided wave, and/or, if frequency mixing is implemented, the sum and/or difference of the frequency components.

At 730, a rail's stress may be determined based on a non-linearity parameter. For example, detector 120 and/or analyzer 130 (see, e.g., FIG. 1) may perform a Fourier Transform to extract the magnitude values of the fundamental frequency and of one or more higher order harmonics and/or the mixing components. These magnitude values of the fundamental frequency and of the higher order harmonics may be used in to determine the ultrasonic nonlinearity. For example, detector 120 and/or analyzer 130 may determine the nonlinear parameter, β, in accordance with Equations 2, 3, 4a, and/or 4b. By measuring the nonlinearity, β, of ultrasonic guided waves propagating at specific guided ultrasonic wave modes and guided ultrasonic wave frequencies along the longitudinal axis of the rail, systems 100 and/or 600 may determine whether a rail is in compressive or tensile stress as described above.

Moreover, in some implementations, measurements of the nonlinearity of ultrasonic guided waves propagating at specific guided ultrasonic wave modes and guided ultrasonic wave frequencies along the longitudinal axis of the rail may be used to determine the neutral temperature, $T_N$, of the rail, as described above, in order to determine the thermal stress of the rail and/or whether the thermal stress is compressive, tensile, or about zero stress (which would be associated with the neutral temperature, $T_N$, of the rail).

At 750, an indication of the thermal stress may be provided. For example, analyzer 130 may provide an indication, such as for example a message, alert, and the like to a user interface at a computer (or other processor) to alert a user to whether the rail is in thermal stress (e.g., whether the rail is in compressive, tensile or zero stress).

Figure 8:
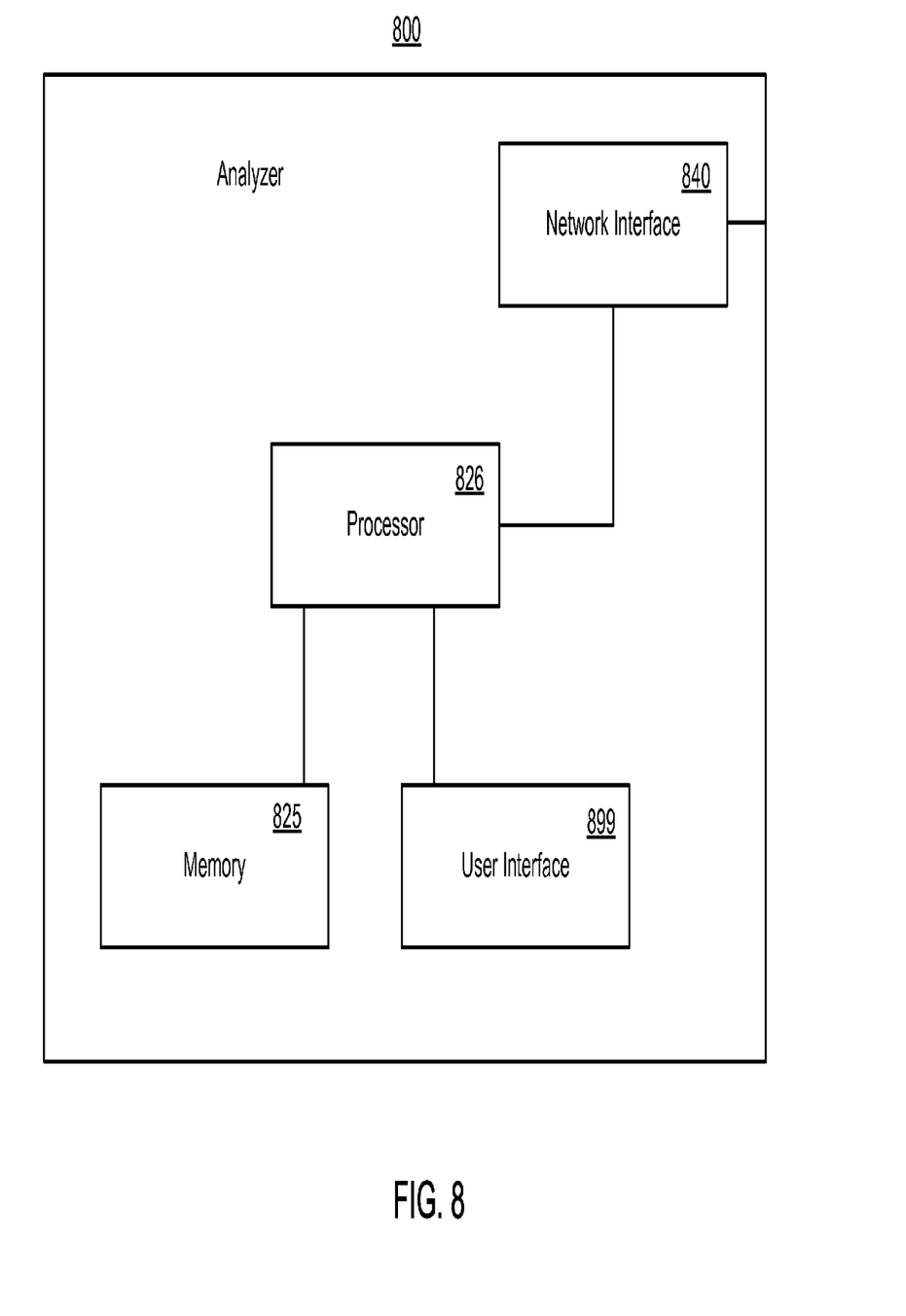
FIG. 8 depicts an example of an analyzer used in connection with detecting thermal stress in rail.

In some implementations, the analyzer 130 may be implemented as processor-based systems that include at least one processor and at least one memory. FIG. 8 depicts an example implementation of an analyzer 800. The analyzer 800 may include one or more of network interfaces, such as for example network interface 840 for coupling to wired and/or wireless networks, at least one processor, such as for example a processor 826 for executing program code stored in memory 825 and storing information representative of for example plots of ultrasonic nonlinear parameter, β versus temperature for rails. Furthermore, the program code may include instructions to perform one or more of process described herein including process 700. The analyzer 800 may also include a user interface 899 to allow a user to interact with analyzer 800.

In some implementations, methods and apparatus, including computer program products, are provided for detecting thermal stresses including at least one of tensile thermal stresses, compressive thermal stresses, and zero thermal stresses.

In some implementations, the subject matter described herein may allow the measurement of a rail's neutral temperature, $T_N$, in a non-destructive manner. Moreover, in some implementations, the systems, methods, and computer-readable media described herein may determine a rail's neutral temperature, $T_N$, with an accuracy of less than about +/−5° F., although other accuracies may be realized as well. Furthermore, in some implementations, the systems, methods, and computer-readable media described herein may determine rail thermal stresses (hence rail Neutral Temperature) with a sensitivity sufficient to minimize the effects of (a) temperature variation alone (changes in elastic constants due to temperature fluctuations), (b) steel texture variation, (c) steel residual stresses from manufacturing or wheel-rail interaction phenomena, and/or (d) support conditions including tie-to-tie variations.

Although the description herein describes using a Fourier Transform and a Fast Fourier Transforms, other transforms and numerical techniques may be used as well.

The systems and methods disclosed herein may be embodied in various forms including, for example, a data processor, such as for example a computer that also includes a storage, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed:

1. A method comprising:
   generating at least one ultrasonic guided wave to enable the at least one ultrasonic guided wave to propagate through a rail;
   detecting at least one of a fundamental frequency component of the at least one ultrasonic guided wave, one or more harmonics of the at least one ultrasonic guided wave, and a mixing component of the at least one ultrasonic guided wave;
   determining a rail neutral temperature based on at least a nonlinearity parameter, wherein the rail neutral temperature represents a temperature of the rail at which a rail thermal stress is about zero;
   determining a stress of the rail based on at least the nonlinearity parameter determined from the detected at least one of the fundamental frequency component, the one or more harmonics, and the mixing component.

2. The method of claim 1, wherein the at least one ultrasonic guided wave comprises at least one wave propagating along a running direction of the rail.

3. The method of claim 1, wherein the determining further comprises:
   normalizing the detected at least one of the fundamental frequency component, the one or more harmonics, and the mixing component.

4. The method of claim 1 further comprising:
   determining the nonlinearity parameter based on at least one of the fundamental frequency component, the one or more harmonics, and the mixing component.

5. The method of claim 1 further comprising:
   determining the nonlinearity parameter based on the following equation:

$$\beta = A_n(n \times f_1)/A_1(f_1)^{\hat{n}} \text{ for } n=2,3,\ldots N,$$

wherein β represents the ultrasonic nonlinear parameter, $A_n$ represents an amplitude of an $n^{th}$ harmonic, $A_1$ represents an amplitude of a fundamental frequency, $f_1$ represents a fundamental frequency, $\hat{n}$ represents an $n^{th}$ power, and n may vary from 2 to the $N^{th}$ harmonic.

6. The method of claim 1 further comprising:
   determining the nonlinearity parameter based on one or more of the following equations:

$$\beta = A_m(f_1+f_2)/A_2(f_2) \text{ and } \beta = A_m(f_1-f_2)/A_2(f_2),$$

wherein β represents the ultrasonic nonlinear parameter, $A_m$ represents an amplitude of the mixing component, $A_2$ represents an amplitude of a fundamental frequency, and $f_1$ and $f_2$ represent first and second fundamental frequencies.

7. The method of claim 1, wherein the stress comprises thermal stress.

8. The method of claim 1, wherein the stress comprises at least one of a tensile stress, a compressive stress, and a rail thermal stress at a rail neutral temperature.

9. The method of claim 1, wherein the stress further comprises:
determining thermal stress based on at least one of a historical neutral temperature of the rail and a wave velocity.

10. An apparatus comprising:
a generator configured to generate at least one ultrasonic guided wave to enable the at least one ultrasonic guided wave to propagate through a rail;
a detector configured to detect at least one of a fundamental frequency component of the at least one ultrasonic guided wave, one or more harmonics of the at least one ultrasonic guided wave, and a mixing component of the at least one ultrasonic guided wave; and
at least one processor configured to determine a rail neutral temperature based on at least a nonlinearity parameter, wherein the rail neutral temperature represents a temperature of the rail at which a rail thermal stress is about zero, the at least one processor further configured to at least determine a stress of the rail based on at least the nonlinearity parameter determined from the detected at least one of the fundamental frequency component, the one or more harmonics, and the mixing component.

11. The apparatus of claim 10, wherein the at least one ultrasonic guided wave comprises at least one wave propagating along a running direction of the rail.

12. The apparatus of claim 10, wherein the detector is further configured to normalize the detected at least one of the fundamental frequency component, the one or more harmonics, and the mixing component.

13. The apparatus of claim 10, wherein the at least one processor is further configured to determine the nonlinearity parameter based on at least one of the fundamental frequency component, the one or more harmonics, and the mixing component.

14. The apparatus of claim 10, wherein the at least one processor is further configured to determine the nonlinearity parameter based on the following equation:

$$\beta = A_n(n \times f_1)/A_1(f_1)^{\hat{n}} \text{ for } n=2,3,\ldots N,$$

wherein $\beta$ represents the ultrasonic nonlinear parameter, $A_n$ represents an amplitude of an $n^{th}$ harmonic, $A_1$ represents an amplitude of a fundamental frequency, $f_1$ represents a fundamental frequency, $\hat{n}$ represents an $n^{th}$ power, and n may vary from 2 to the $N^{th}$ harmonic.

15. The apparatus of claim 10, wherein the at least one processor is further configured to determine the nonlinearity parameter based on one or more of the following equations:

$$\beta = A_m(f_1+f_2)/A_2(f_2) \text{ and } \beta = A_m(f_1-f_2)/A_2(f_2),$$

wherein $\beta$ represents the ultrasonic nonlinear parameter, $A_m$ represents an amplitude of the mixing component, $A_2$ represents an amplitude of a fundamental frequency, and $f_1$ and $f_2$ represent first and second fundamental frequencies.

16. The apparatus of claim 10, wherein the stress comprises thermal stress.

17. The apparatus of claim 10, wherein the stress comprises at least one of a tensile stress, a compressive stress, and a rail thermal stress at a rail neutral temperature.

18. The apparatus of claim 10, wherein the stress further comprises:
determining thermal stress based on at least one of a historical neutral temperature of the rail and a wave velocity.

19. A computer-readable storage medium including code which when executed by at least one processor provides operations comprising:
generating at least one ultrasonic guided wave to enable the at least one ultrasonic guided wave to propagate through a rail;
detecting at least one of a fundamental frequency component of the at least one ultrasonic guided wave, one or more harmonics of the at least one ultrasonic guided wave, and a mixing component of the at least one ultrasonic guided wave;
determining a rail neutral temperature based on at least a nonlinearity parameter, wherein the rail neutral temperature represents a temperature of the rail at which a rail thermal stress is about zero;
determining a stress of the rail based on at least the nonlinearity parameter determined from the detected at least one of the fundamental frequency component, the one or more harmonics, and the mixing component.

20. The computer-readable storage medium of claim 19, wherein the at least one ultrasonic guided wave comprises at least one wave propagating along a running direction of the rail.

21. The computer-readable storage medium of claim 19, wherein the determining further comprises:
normalizing the detected at least one of the fundamental frequency component, the one or more harmonics, and the mixing component.

22. The computer-readable storage medium of claim 19 further comprising:
determining the nonlinearity parameter based on at least one of the fundamental frequency component, the one or more harmonics, and the mixing component.

23. The computer-readable storage medium of claim 19 further comprising:
determining the nonlinearity parameter based on the following equation:

$$\beta = A_n(n \times f_1)/A_1(f_1)^{\hat{n}} \text{ for } n=2,3,\ldots N,$$

wherein $\beta$ represents the ultrasonic nonlinear parameter, $A_n$ represents an amplitude of an $n^{th}$ harmonic, $A_1$ represents an amplitude of a fundamental frequency, $f_1$ represents a fundamental frequency, $\hat{n}$ represents an $n^{th}$ power, and n may vary from 2 to the $N^{th}$ harmonic.

24. The computer-readable storage medium of claim 19 further comprising:
determining the nonlinearity parameter based on one or more of the following equations:

$$\beta = A_m(f_1+f_2)/A_2(f_2) \text{ and } \beta = A_m(f_1-f_2)/A_2(f_2),$$

wherein $\beta$ represents the ultrasonic nonlinear parameter, $A_m$ represents an amplitude of the mixing component, $A_2$ represents an amplitude of a fundamental frequency, and $f_1$ and $f_2$ represent first and second fundamental frequencies.

25. The computer-readable storage medium of claim 19, wherein the stress comprises thermal stress.

26. The computer-readable storage medium of claim 19, wherein the stress comprises at least one of a tensile stress, a compressive stress, and a rail thermal stress at a rail neutral temperature.

27. The computer-readable storage medium of claim 19, wherein the stress further comprises:
   determining thermal stress based on at least one of a historical neutral temperature of the rail and a wave velocity.

* * * * *